Sept. 14, 1965  B. TERLECKY  3,205,834
CARGO TIE-DOWN
Filed Sept. 28, 1961
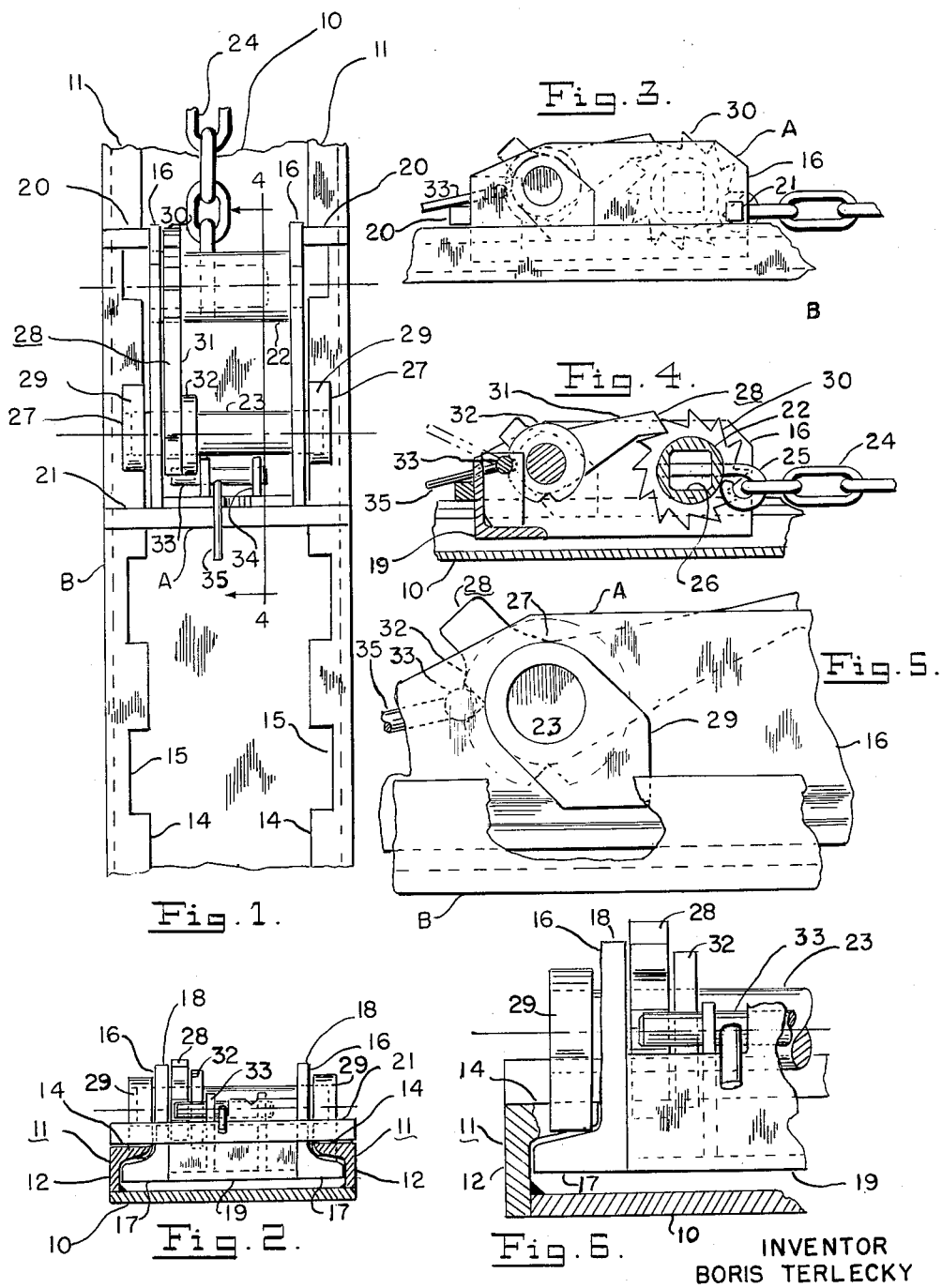
INVENTOR
BORIS TERLECKY
BY
Robert J. Shields
ATTORNEY United States Patent Office 3,205,834
Patented Sept. 14, 1965

3,205,834
CARGO TIE-DOWN
Boris Terlecky, Bronx, N.Y., assignor to ACF Industries, Incorporated, New York, N.Y., a corporation of New Jersey
Filed Sept. 28, 1961, Ser. No. 141,343
5 Claims. (Cl. 105—368)

This invention relates to cargo tie-down devices, and more particularly to a tie-down device having a load brace adjustably anchorable on a track.

The tie-down devices presently available are unsatisfactory since they do not have load braces that are readily adjustable to secure cargo from any direction of pull. The use of presently available tie-down devices necessitate the use of a left and a right brace or a forward and rearward brace or different designed load braces to tie-down cargo from more than one direction.

It is the purpose of this invention to provide an anchoring device that has a readily adjustable cargo load brace whereby a number of identical type of load braces may be interchangeably utilized to anchor cargo from more than one direction of pull.

An object of this invention is to provide a number of identical type load braces supported in elongated tracks to adjustably secure cargo such as a vehicle from either the front, rear or sides of the vehicle without necessitating the removal of the load braces from the tracks.

Another object of this invention is to provide a versatile tie-down device having an anchoring lock and winch device and an elongated securing track and whereby the track is mounted on either the floor, wall or ceiling of a structure such as a railway car and the anchoring lock and winch device is readily adjustable within the track to wedge and lock itself onto the track, upon application of force on the winch to thereby tie down cargo from substantially any direction and from substantially any position within the railway car.

A further object of this invention is to provide a simple tie-down device which may be readily associated with substantially any part of a structure such as a railway car and that requires a minimum of manual effort for securing cargo, such as a vehicle on the railway car.

Another object of this invention is to provide an improved tie-down lock and winch device to secure a cargo such as a vehicle from either the side, front or rear end of the vehicle, which is compact, easily accessible, and that is so constructed that it may be easily and completely removed or installed and anchored on a track.

These and other objects will be apparent from the description and drawings in which:

FIGURE 1 is a plan view of a portion of a track with a lock and winch combination in accordance with a preferred embodiment of the invention;

FIGURE 2 is an end view partly in section of the structure shown in FIGURE 1;

FIGURE 3 is a side view of the structure as shown in FIGURE 1;

FIGURE 4 is a sectional view taken on line 4—4 of FIGURE 1;

FIGURE 5 is an enlarged fragmentary side view of the structure, as shown in FIGURE 3, with parts broken away to better show details; and, FIGURE 6 is an enlarged fragmentary end view of the structure as shown in FIGURE 2 with parts broken away to better show details.

Referring now, to the drawings in detail, it will be seen that the tie-down device includes a load brace such as a lock and winch A and a structure such as an elongated channel-shaped guide rail or track B to brace or anchor cargo upon any framework such as a railway car (not shown). The load brace is adjustable on the track and the track is adapted to hold the load brace in substantially any selected directional anchoring position. The drawings illustrate a section of the single track B carrying one load brace A, but it should be understood that to secure cargo such as a vehicle upon a framework such as a railway car, an additional identical track is needed, that may be transversely spaced and be parallel to the track shown in the drawings. A number of identical load braces, as would be hereafter more fully described, would be supported in each track and would cooperate each with the other and the track to secure the cargo or vehicle onto the railway car. Accordingly, therefore, a detailed description of one track and one load brace will suffice.

The track B which may be rigidly secured to the floor, wall or ceiling of a railway car (not shown), comprises a flat bottom plate 10 with two angled side plates 11 extending therefrom to form a channel section. Each of the side plates having one leg 12 welded or otherwise secured perpendicular to the bottom plate 10 and one leg 14 spaced from and directed inwardly from leg 12 parallel to the plate 10. The legs 14 project toward each other and have spaced apart confronting edges in which are formed spaced apart recesses 15.

The load brace A is mounted within the channel section track B and is symmetrically supported between the legs 14 for longitudinal movement along the track. The load braces are inserted into the track at either end of the track and then both ends of the track may be closed by any means such as end plates (not shown) to prevent the load braces from sliding out of the track. The load brace comprises a housing which is constructed of a pair of side angles 16, each having a short leg 17 and a long leg 18. The angles 16 are joined together by an angle 19. The short legs 17 of angles 16, as best shown in FIGURE 2, are directed outwardly between the plate 10 and the inwardly directed legs 14 of the track angled side plates 11. The long leg 18 is adjacent to the inner edge of leg 14 and is parallel to the leg 12. This interlocks the load brace A in parallel axial relationship, within the channel-shaped track B. Slidably supporting the load brace at one end on legs 14, in a longitudinal free floating position, are a pair of laterally extending square members 20 which are welded or otherwise secured to the load brace housing. The other end of the housing is slidably supported by a laterally extending square rod 21 abutting angle 19 and welded or otherwise secured to the load brace housing. The entire load brace assembly is therefore movable longitudinally along the track without falling out of engagement with the track even if the track is secured upside down, such as on the ceiling of a railway car.

Referring again to the drawings, it will be seen that journalled in the housing between the spaced load brace side angles 16 are a pair of paralleled shafts 22 and 23. The shaft 22 serves as a winch drum about which a tension member such as a length of chain 24 is wound. One end of the chain is secured to the drum, such as by inserting the straight leg of a hook link 25 diametrically through the shaft 22 and welding or otherwise securing it therein as best shown in FIGURE 4. The other end of the chain is secured to cargo such as vehicle (not shown) at a suitable connecting point, for example the axle. Centrally located, coaxially within the drum 22 is located an elongated square bore 26 adapted to receive a crank with a handle (not shown) or to receive any suitable power actuated mechanism, for imparting rotation to wind up the chain onto the drum 22.

In order to secure and anchor cargo or vehicles on railway cars the shaft 23, serving as a lock shaft, carries suitable locking means such as stop means 27 and latch means 28. The stop means comprise a pair of wedges 29 welded or otherwise secured to the ends of shaft 23. The ends of shaft 23, with the wedges 29 extend beyond the load brace side angels 16 on both sides of the load brace housing. For anchoring and to prevent longitudinal movement of the load brace on the track each wedge 29 is adapted to project and wedge into one of the longitudinally spaced recesses 15 in the edges of leg 14 of the track angled side plates 11. Neglecting for the time being, the device that is used to prevent rotation of the shaft 23 with the wedges 29, it will be seen in FIGURE 5 that the wedges 29 will transmit any longitudinal force applied to the winch directly to the track B. If the force on the winch is towards the right as viewed in FIGURE 5, the wedges 29 must be in a position shown in solid, but if the force on the winch is towards the left the wedges 29 must be rotated in a position facing towards the left as viewed in FIGURE 5 (not shown). It would be apparent regardless of the direction in which wedges 29 are pointing that a vertical surface will engage the ends of recesses 15 and the wedges will tend to rotate towards short legs 17.

The latch means 28 is used to keep the chain taut and to prevent rotation in the reverse direction when the rotating pressure on the winch drum in the tightening direction is released. The latch means comprises a ratchet 30, welded or otherwise nonrotatably secured to the shaft 22 and engaging a pawl 31 pivotally mounted on shaft 23.

Adjacent to the pawl 31 is a washer 32 welded or otherwise affixed to the shaft 23. The pawl and the washer are provided with aligned V grooves for reception of a bolt latch 33 slidable within bracket 34 which is welded on the housing. The bolt latch 33 positively locks the pawl within the ratchet to prevent disengagement and thereby unwinding of the chain. In addition, the bolt latch 33 locks the washer 32 to thereby prevent rotation of the shaft 23 and disengagement of the wedges 29 out of the recesses 15. Therefore, when tension is applied to the chain to anchor cargo the wedges prevent the load device from moving along the track and the pawl and ratchet prevent unwinding of the chain from the winch drum.

From the preceding, it will be seen that the load brace may anchor cargo from any direction, depending on the location of the track. In anchoring cargo the operation would be to first rotate the wedges 29 into the recesses 15 pointing in the direction of the chain pull, then wind the chain 24 taut, engage the pawl 31 in the ratchet 30 if necessary, and lock both the pawl and wedges by bolt latch 33. It should be noted, that the washer has two V grooves on its periphery within which the bolt latch 33 may be inserted to lock the wedges in the aforementioned positions, while only one V groove is needed for locking the pawl within the ratchet for any of the positions mentioned.

The bolt latch 33 may be provided with a spring (not shown) extending coaxially with the bolt latch and extending between its right supporting bracket 34 and handle 35, as viewed from FIGURE 1, to keep the latch 33 in positive locking contact with the V grooves of the pawl and the washer. This is particularly required when the load brace and the track are in an inverted position within the railway car.

From the preceding description, it will be apparent that a number of load braces may be provided movably secured on a properly designed structure or on one or two tracks, to tie down cargo from any direction. Some load braces on the track may be facing in one direction and others in another direction, or all the load braces may be facing in one direction. It will also be apparent that the lading whether it be cargo or vehicles will be anchored or released, using the present load brace with very little manual effort on the part of the operator. It will also be apparent from the description that various modifications may be made without departing from the scope of the invention as defined by the following claims.

What is claimed is:

1. A load brace unit for anchoring cargo adapted to be secured to an elongated structure within a railway car comprising, a housing, a winch drum journalled within said housing, a chain having one end secured to said winch drum and the other end adapted to be secured to and exert tension on cargo, a ratchet coaxially secured to said winch drum, a lock shaft spaced from and parallel to said winch drum, said lock shaft being journalled within said housing and having ends extending outwardly on each side of said housing, wedges secured to the ends of said lock shaft outwardly of said housing and extending to lock within the elongated structure of the railway car at a predetermined location, means by which said winch drum may be engaged and rotated to wind said chain onto said drum, and a pawl pivotally mounted on said lock shaft and extending to engage said ratchet to lock said winch drum against reverse rotation when the rotating pressure on the winch in the tightening direction is released.

2. A cargo tie-down device to secure cargo such as a vehicle onto a railway car comprising, an elongated channel-shaped guide rail adapted to be secured to the railway car, said rail having inwardly directed flanges with spaced apart confronting edges and longitudinally spaced apart recesses formed in said confronting edges, a housing supported by and riding upon said flanges for longitudinal movement along said rail, a winch drum journalled within said housing, a chain having one end secured to said winch drum and the other end adapted to be secured to and exert tension on cargo, a ratchet coaxially secured to said winch drum, a lock shaft spaced from and parallel to said winch drum, said lock shaft being journalled within said housing and having ends projecting laterally outwardly of the housing, wedges secured to the ends of said shaft and overlapping the sides of said housing, said wedges being rotatable into the recesses at a predetermined location on the guide rail, and a pawl pivotally mounted on said lock shaft between the sides of said housing and extending to engage said ratchet to lock said winch drum against reverse rotation when said drum is rotated to draw up tension between it and the cargo and the rotating pressure on the winch in the tightening direction is released.

3. A cargo tie-down device for anchoring cargo comprising, an elongated upwardly facing channel shaped guide rail having inwardly directed top flanges facing each other to provide a space therebetween, spaced apart recesses formed in the inwardly facing top flanges and at predetermined locations, a load brace mounted within the guide rail and having portions engageable with the lower surface of said inwardly directed top flanges, a winch drum journalled in said load brace with the axis of the drum located above said inwardly directed top flanges, a tension member extending from the drum for engagement with cargo and adapted to be wound on said winch drum to exert tension on the cargo, a lock shaft having ends projecting outwardly from the sides of the load brace and journalled therein in spaced relation to said winch drum, wedges supported by said lock shaft outwardly of the sides of the load brace and adapted to project into said recesses at a predetermined location to hold said load brace from longitudinal movement along the guide rail, latch means carried by said lock shaft and rotatable to lock said winch drum against unwinding after said tension member has been wound on the drum to thereby hold cargo in an anchored position.

4. The structure of claim 3 characterized in that a second latch means is mounted on said load brace, said second latch means being operable to lock said first latch means and said wedge means against rotation.

5. An anchoring device for anchoring cargo comprising in combination, an upwardly facing elongated channel-shaped guide rail having spaced apart recesses at the upper edge thereof, a load brace adapted for longitudinal movement along the guide rail, a winch drum rotatably journalled in said load brace, a tension member having one end secured to said winch drum and the other end extending to engage and exert tension on cargo in any direction within substantially 180 degrees around the axis of said winch drum, a lock shaft rotatably journalled within said load brace and being spaced from and parallel to said winch drum, wedges mounted on said lock shaft for rotational movement therewith to simultaneously engage a plurality of selected recesses on said guide rail, said wedges extending towards said rail in the same general direction as said tension member, and lock means preventing rotation of said lock shaft thereby securing said load brace on said guide rail and also preventing reverse rotation of said winch drum after said winch drum has drawn tension between it and the cargo to thereby secure cargo in any direction within the aforementioned 180 degrees at said selected recess position.

References Cited by the Examiner

UNITED STATES PATENTS

| | | | |
|---|---|---|---|
| 1,693,184 | 11/28 | Rumely | 105—368 |
| 2,969,023 | 1/61 | Chapman et al. | 105—368 |
| 2,970,552 | 2/61 | Baker | 105—368 |
| 3,038,740 | 6/62 | Blunden | 105—368 |
| 3,092,368 | 6/63 | McDowell et al. | 280—179 X |

MILTON BUCHLER, *Primary Examiner.*

LEO QUACKENBUSH, *Examiner.*